UNITED STATES PATENT OFFICE.

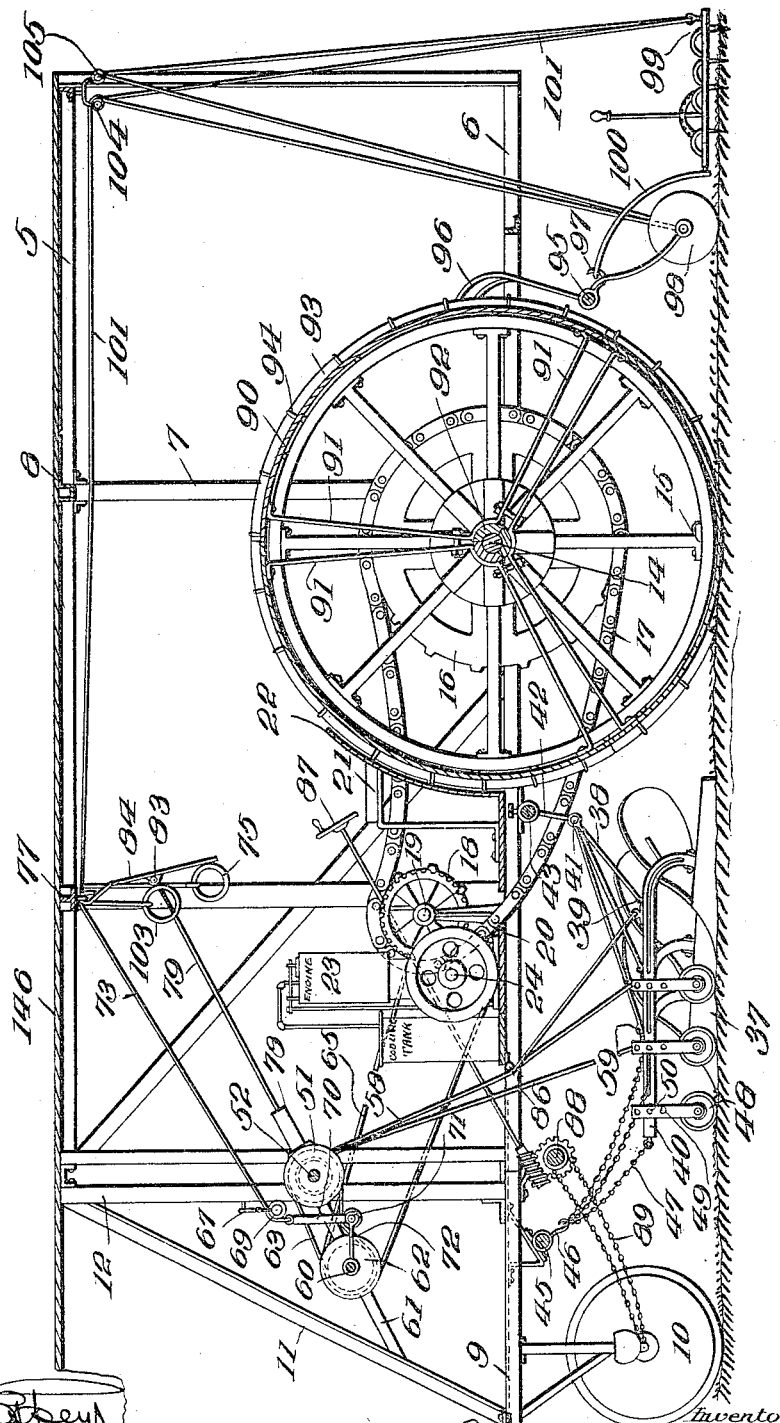

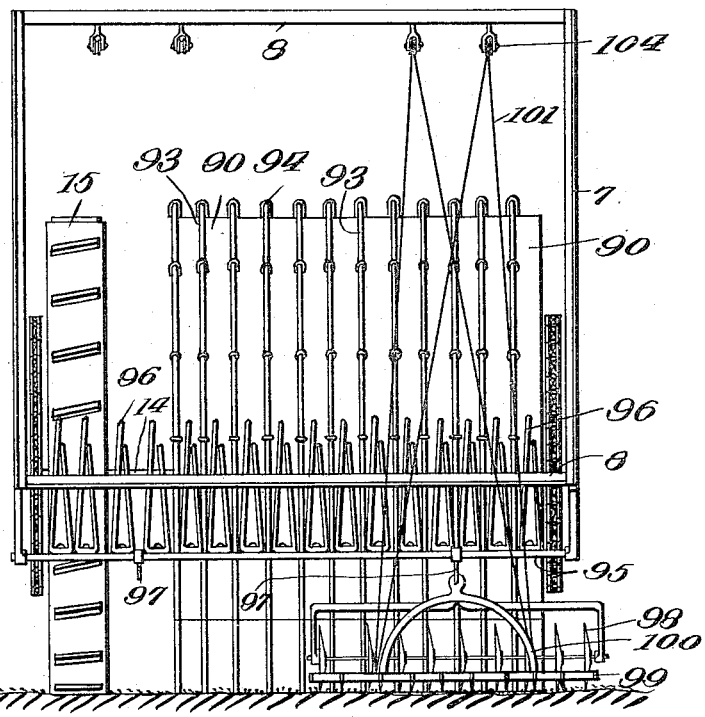
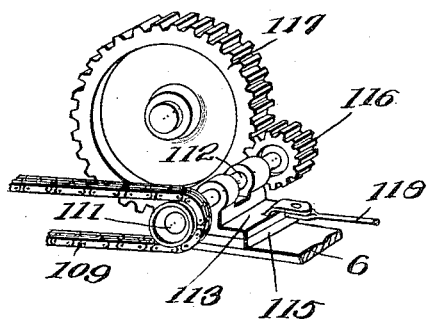
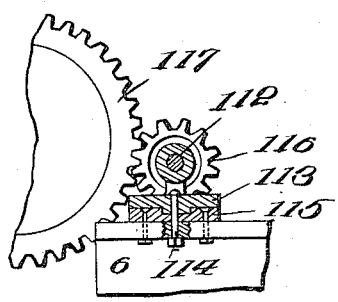

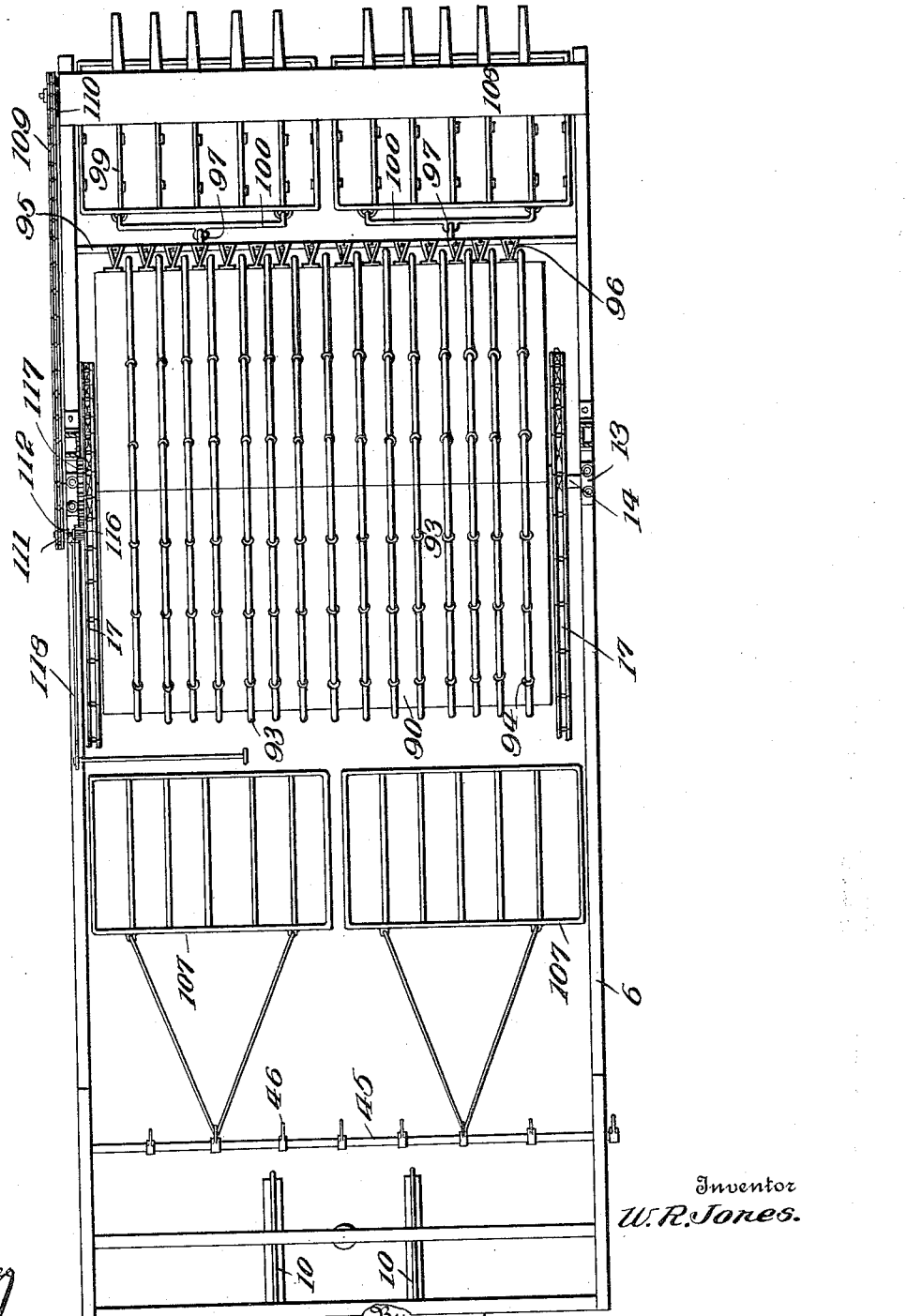

WILLIAM R. JONES, OF MARION, MICHIGAN.

AGRICULTURAL MACHINE.

1,127,630.  Specification of Letters Patent.  Patented Feb. 9, 1915.

Application filed April 18, 1913. Serial No. 762,158.

*To all whom it may concern:*

Be it known that I, WILLIAM R. JONES, a citizen of the United States, residing at Marion, in the county of Osceola and State of Michigan, have invented certain new and useful Improvements in Agricultural Machines, of which the following is a specification.

The object of the present invention is to provide a motor-driven agricultural machine by the use of which the ground may be simultaneously pulverized and packed.

The invention also seeks generally to improve the construction and arrangement of the parts of this class of machinery so as to increase the utility, durability and efficiency of the same.

The invention is illustrated in the accompanying drawings and consists in certain novel features which will be hereinafter first fully described and then more particularly pointed out in the claims following the description.

In the drawings: Figure 1 is a longitudinal vertical section of a motor-driven machine embodying my present invention; Fig. 2 is a rear elevation; Fig. 3 is a plan view with the cover and platform removed, drag harrows being substituted for the plows and a grain drill being shown in position for use; Figs. 4 and 5 are detail perspective views of a portion of the gearing for actuating the grain drill.

In carrying out my invention, I employ a supporting frame or truck including upper and lower side bars 5 and 6, preferably formed of angle iron, connected by spaced uprights 7 to which are bolted or otherwise rigidly secured spaced transverse bars 8. The supporting frame or truck is provided with a detachable extension 9 on which are pivotally mounted the steering wheels 10, said extension being provided with rearwardly inclined braces 11 having their upper ends connected to uprights 12, similar in construction to the uprights 7 and which form a continuation of the main frame of the truck when the machine is used as a plow or grain drill.

Journaled in suitable bearings 13 on the upper side bars of the truck, is a rear axle 14 on which are mounted for rotation spaced traction wheels 15. Each traction wheel 15 is provided with a sprocket wheel 16 over which extends a sprocket chain 17 leading to a relatively small sprocket wheel 18 mounted on a stub shaft 19. Resting on the lower side bars of the truck, is a platform 20 having a seat 21 secured thereto and provided with an upwardly and rearwardly extending plate 22 which forms a guard for the traction wheels 15, as best shown in Fig. 1 of the drawings.

Mounted on the platform 20, is an engine or other suitable motor 23, the driving shaft 24 of which extends transversely of the truck and is connected by suitable gearing with the adjacent stub-shaft 19 so that when the driving shaft 24 is rotated, the machine may be caused to travel either in a forward or rearward direction or the engine allowed to run without affecting the truck.

Arranged directly beneath the platform 20, are a gang of plows 37, preferably disposed one slightly in advance of the other and each provided with a rearwardly extending arm 38, the lower end of which is pivotally mounted at 39 on the adjacent plow beam 40, while the upper end thereof is pivotally connected at 41 to a relatively short link 42 suspended from a bar or rod 43 extending transversely of the truck frame in advance of the traction wheels. The connecting links 42 are pivotally mounted on the rod or bar 43 and are adjustable laterally thereon so as to permit the plows 37 to be centered with respect to the truck frame or moved laterally to either side thereof as the case may be, said links being supported in adjusted position by means of screws or other clamping devices.

Secured to the extension 9 of the truck frame, is a transverse draft bar 45 to which are secured a plurality of spaced hooks 46, each hook receiving a draft chain 47 leading to the adjacent plow beam, as shown.

It will here be noted that by reason of the pivotal connections 39, 41 and 42, the plows are free to move forwardly and upwardly so as to conform to any irregularities in the surface soil over which the machine is traveling. It will also be noted that the plows are movable independently of each other so that should one of the plows strike an obstruction in the path of movement of the truck, the other plows will not be affected. Moreover, this manner of suspending or hanging the plows from the truck frame permits the plows to pass over hilly or rolling ground and produce an even furrow of uniform depth, regardless of the surface contour of the soil.

Depending from each plow beam 40, is a caster wheel 48, the shank of which is provided with a plurality of openings 49 adapted to receive a pin or similar fastening device 50 so that by placing said pin 50 in the different openings 49, the depth of penetration of the plow point into the soil may be regulated at will.

As a means for successively raising and lowering the plows so as to leave the ends of the furrows in transverse alinement at the opposite ends or sides of a field, or when transporting the truck from one place to another, there are provided a plurality of winding drums 51 mounted for rotation on a stationary shaft 52, each drum being provided with a ratchet head and a pulley. To each winding drum is secured the adjacent end of a cord, chain or other flexible medium 58, the other end of said cord or chain being fastened to an eye 59 secured to the upper longitudinal edge of the adjacent plow beam at a point slightly in advance of the pivot 39.

The stationary shaft 52 is rigidly secured to the uprights 12 of the truck extension, and disposed in a plane slightly below and in advance of the stationary shaft 52 is a rotating shaft 60, the latter being journaled in suitable brackets 61 also carried by the truck extension 9. Keyed or otherwise rigidly secured to the rotating shaft 60, are a plurality of wheels or pulleys 62 over which extend endless belts 63 leading to and encircling the pulleys of the adjacent winding drums. Secured to one end of the shaft 60, is a belt pulley over which extends a belt 65 leading to the belt pulley on the driving shaft 24, so that when the shaft 24 is rotated, motion will be transmitted through the medium of the belt 65 to the pulleys 62 on the shaft 60 and thence through the belts 63 to the pulleys of the drums 51, thereby to wind the cords 58 on the drums and effect the raising of the plows. A clutch is mounted on the platform to permit the belt pulley on the engine shaft to be thrown into and out of operation at will.

Arranged above and at a point between the shafts 52 and 60, is a transverse bar 67 from which are suspended suitable sheaves or pulleys 69. Suspended from each pulley 69, is a yoke or hanger 70 having an idle pulley 71 journaled therein for engagement with the adjacent belt 63, said yoke or hanger being provided with arms 72 which encircle the shaft 60 on opposite sides of the adjacent pulley 62 so as to permit the idle pulley 71 to be moved into and out of engagement with the belt 63. Extending over the sheaves or pulleys 69, are cords or chains 73, one end of each of which is attached to the suspension eye of the adjacent yoke 70, while the other end thereof extends over a sheave or pulley on the main frame and is provided with a terminal finger ring 75, said sheaves being adjustable longitudinally of a bar 77 connecting the upper sills 5 of the truck frame Thus it will be seen that by exerting a downward pull on any one of the finger rings 75, the idle pulley 71 will be moved into engagement with the adjacent belt 63 so as to tighten the belt and thus cause motion to be transmitted from the rotating shaft 60 to the adjacent drum to effect the raising of the plows.

The casing of each winding drum is provided with tubular extensions 78 in which is slidably mounted a locking rod 79, the free end of which engages the teeth on the ratchet head of the drum so that after the drum has been rotated to effect the elevation of the plow, the locking rod will automatically lock or hold the plow in elevated position.

The locking rods 79 are pivotally connected at 83 with suitable hand operated levers 84 depending from the bar 77 so that by pressing rearwardly on the free ends of the levers 84, the rods 79 may be disengaged from the ratchet heads so as to permit the plows to return by their own weight to lowered position. As soon as the levers 84 are released, however, the rods will automatically engage the ratchet heads and prevent further rotation of the winding drums. In this manner, the plows may be supported in any desired position of vertical adjustment. It will of course be understood that the locking rods 79 are so disposed as to permit winding of the cords or cables on the drums, but will prevent reverse movement of said drums when the locking rods are in engagement with the ratchet heads.

The finger rings 75 and levers 84 are preferably disposed at a point directly above the operator's seat 21 so that the driver or operator of the machine may conveniently manipulate the various levers and finger rings without the necessity of leaving his seat.

Secured to the forward longitudinal edge of the platform 20, are a plurality of relatively small rollers 86 which bear against the adjacent cords or chains 58 and serve to prevent abrasion or injury thereto when raising and lowering the plows. A steering head 87 is also preferably disposed near the operator's seat 21 and connected with a transverse shaft 88 to which are secured spaced chains 89 leading to the steering wheels 10 so that the truck may be guided in the usual manner.

Interposed between the traction wheels 15, is a cylindrical pulverizing drum or packer, said drum or packer being preferably formed in sections 90 each provided with inwardly extending braces 91, the converging ends of which are bolted together and to a boxing 92 around the rear axle of the truck. Each section of the cylindrical drum or packer is provided with a plurality of ribs 93 which serve to crush or pulverize the soil, there being traction lugs 94 formed on the ribs in order to prevent slipping thereof.

The sections of the drum or packer may extend over the traction wheels and bridge the entire space between the same, as shown in Fig. 3, or they may occupy only a portion of the space between the side bars of the frame, as shown in Fig. 2, it being understood that in Fig. 3 the traction wheels are within the pulverizer.

When only three plows are used in the gang, the sections of the drum or packer will terminate short of one of the traction wheels, as shown in Fig. 2, and thus allow the traction wheel having no packer section secured thereto, to travel on the unplowed ground. This construction also permits the ground to be plowed close to a fence or away from the fence, as desired.

Extending transversely of the truck frame at the rear of the combined packer and pulverizer, is a rod 95 to which are secured a plurality of spaced scraping knives or fenders 96, which latter operate between the pulverizing ribs 93 and serve to prevent dirt adhering to the packer and thus clogging or otherwise obstructing the same.

The rod 95 is also provided with spaced hooks 97 from which are preferably suspended one or more disk harrows, indicated at 98. Arranged at the rear of the disk harrows, 98 are drag harrows 99, each provided with a yoke or bail 100 which projects forwardly for attachment to the adjacent hook 97.

As a means for raising and lowering the disk harrow 98, there is provided a suitable operating cord 101, one end of which extends over a pulley on the bar 77 and is provided with a finger piece 103, while the other end thereof is provided with an extra strand, which strands pass over a sheave or pulley 104 for attachment to the disk harrow 98, and are thence extended upwardly and fastened over a hook 105. Thus it will be seen that by exerting a downward pull on the finger piece 103, the disk harrow 98 may be raised and lowered, at will Similar ropes or cables are connected with the drag harrow 99.

When three plows are used in a gang, only one disk harrow and one drag harrow is employed, as best shown in Fig. 2 of the drawings, and when additional plows are added to the gang, an extra disk harrow and drag harrow will be arranged at the rear of the machine and extra sections fastened to the pulverizer and packer.

Thus it will be seen that as the machine is caused to travel in a forward direction over a field or other inclosure, the plows will turn the soil, while the drum will pulverize and pack the soil and the members 98 and 99 disk and drag the same, thus placing the soil in condition for planting. In starting to plow a field, one of the plows is allowed to enter the soil, while the other two are elevated. As the machine travels in a forward direction, the elevated plows are successively allowed to drop so that they will enter the ground in transverse alinement with the furrow formed by the first mentioned plow, and conversely, at the end of the field, the plows are successively elevated by means of the winding drums so that the machine leaves all of the furrows in predetermined transverse alinement, as will be readily understood.

When it is desired to use the machine as a grain drill, the gang of plows are detached and two drag sections 107 are used in lieu thereof and operatively connected with the bar 43 and draft bar 45. When the truck is used in this manner, the sections comprising the pulverizer and packer are assembled so as to entirely fill the space between the side bars of the truck frame and a grain drill 108 of any suitable construction supported on the said side bars at the rear of the packer and pulverizer.

In order to operate the seed dropping mechanism, there is provided a sprocket chain 109 which extends over a sprocket wheel 110 connected with the seed dropping mechanism, and also over a relatively small sprocket wheel 111 mounted on a stub shaft 112. The stub shaft 112 is journaled in a suitable bracket 113, which bracket is in turn pivotally mounted at 114 on a corresponding bracket 115 secured to one of the side bars of the truck frame, as best shown in Figs. 9 and 10 of the drawings. The stub shaft 112 is provided with a pinion 116 which meshes with a master gear 117 secured to one of the traction wheels 15. A rod 118 is pivotally connected at one corner of the plate or bracket 113 and is extended to a point within convenient reach of the operator's seat so that by exerting a pull in one direction on the rod 118, the pinion 116 may be thrown into engagement with the master gear 117 so as to actuate the seed dropping mechanism, and by exerting a pull in the opposite direction on said rod, the pinion may be disengaged from the master gear 117 so as to permit the machine to travel without affecting the seed dropping mechanism.

When the machine is used as a grain drill, the disk harrows 98 are preferably removed from the machine and the drag harrows 99 attached directly to the hooks 97, as best shown in Fig. 3 of the drawings.

By dismantling the machine, that is to say, by removing the plows, packer, pulverizer, disk and drag harrows, as well as the plow raising and lowering mechanism, and setting the front axle and steering wheels back to a position beneath the platform 20, the machine may be used with good results as a traction engine for general farm use.

The machine is preferably provided with a suitable cover 146 which serves to house and protect the operating mechanism of the machine, as best shown in Fig. 1 of the drawings.

It will of course be understood that any desired number of plows may be mounted on the machine and the relative disposition of the several parts, as well as the size and proportions thereof may be varied at will, without departing from the spirit of the invention.

From the foregoing description, it is thought that the construction and operation of the device will be readily understood by those skilled in the art and further description thereof is deemed unnecessary.

What I claim is:—

1. A pulverizer and packer consisting of a traction shaft and a cylinder about said shaft, said cylinder composed of a plurality of segmental sections and inwardly converging braces extending from said sections and secured to each other about the shaft.

2. In an agricultural machine, the combination of a truck, traction wheels therefor, an axle for said traction wheels journaled on the truck, a pulverizer and packing cylinder having its ends fitted over the traction wheels and consisting of segmental sections, and braces extending inwardly from said segmental sections and having their inner ends secured together about the axle.

In testimony whereof I affix my signature in presence of two witnesses.

WILLIAM R. JONES. [L. S.]

Witnesses:
R. A. LEWIS,
F. D. ELLIOTT.

Copies of this patent may be obtained for five cents each, by addressing the "Commissioner of Patents, Washington, D. C."